United States Patent
Kolesnikov et al.

(10) Patent No.: US 10,758,861 B2
(45) Date of Patent: Sep. 1, 2020

(54) METHOD OF GAS ABSORPTION AND THE DEVICE FOR ITS IMPLEMENTATION

(71) Applicant: Universidad Nacional Hermilio Valdizan Huanuco, Huanuco (PE)

(72) Inventors: Vladimir Petrovich Kolesnikov, Huanuco (PE); Andrei Nikolaevich Kochetov, Huanuco (PE); Liubov Iurevna Chernikova, Huanuco (PE)

( * ) Notice: Subject to any disclaimer, the term of this patent is extended or adjusted under 35 U.S.C. 154(b) by 90 days.

(21) Appl. No.: 16/093,199

(22) PCT Filed: Apr. 3, 2017

(86) PCT No.: PCT/RU2017/000197
§ 371 (c)(1),
(2) Date: Oct. 12, 2018

(87) PCT Pub. No.: WO2017/180022
PCT Pub. Date: Oct. 19, 2017

(65) Prior Publication Data
US 2019/0060823 A1 Feb. 28, 2019

(30) Foreign Application Priority Data
Apr. 14, 2016 (RU) .............................. 2016114625

(51) Int. Cl.
*B01D 53/18* (2006.01)
*B01D 53/14* (2006.01)

(52) U.S. Cl.
CPC ......... *B01D 53/1406* (2013.01); *B01D 53/18* (2013.01); *B01D 53/185* (2013.01)

(58) Field of Classification Search
CPC ... B01D 53/1406; B01D 53/18; B01D 53/185
(Continued)

(56) References Cited

U.S. PATENT DOCUMENTS 3,739,551 A * 6/1973 Eckert .................... B01D 47/06
95/211
6,217,759 B1 * 4/2001 Kolesnikov ............. C02F 3/121
210/151
(Continued)

FOREIGN PATENT DOCUMENTS

RU          2310499 C2 * 11/2007

*Primary Examiner* — Thomas M Lithgow
(74) *Attorney, Agent, or Firm* — Eugenio J. Torres-Oyola; Victor M. Rodriguez-Reyes; Ferraiuoli LLC

(57) ABSTRACT

The method includes limiting saturation of output absorbent with dispersed and recirculating gas molecules with full completion of chemical reactions in the first stage, counter-current contact between the gas and absorbent in the loading elements of the nozzle in the second stage, further extraction of gas molecules by absorbent in the irrigation chamber of the third stage. Then the gas for the absorption of hard-to-recover components is transferred to the irrigation chamber of the fourth stage, where it is irrigated with fine droplets of fresh and circulating absorbent. Then the direct-flow contact between the gas-liquid phase is carried out in the checker loading elements of the fifth stage. Finally, interphase contact of depleted gas with absorbent is completed in the bubbling chamber of the sixth stage and in the interchamber space between the fifth and sixth chambers.

The bubbling chamber of the I stage is divided by a partition into the final and the main bubbling chambers, and the ceramic dispersants and/or hypersonic Hartmann's oscillators are installed in them. The pipeline of the removal of the saturated absorbent is attached to the final chamber, and the circulation pumps are attached to the main chamber of the I stage the and bubbling chamber of the VI stage, the pressure pipelines of the circulation pumps are connected to the scattering reflectors of the irrigation chambers of the III and IV stages. The pressure pump pipeline for supplying the fresh absorbent is connected to the hypersonic acoustical (Continued)

dispersant and the scattering reflectors which are set in the irrigation chamber of the IV stage. The space between the chambers of the I and the II stage is closed and attached by the pipeline of the gas discharge conduit to the distribution nozzles mounted at the bottom of the checker chamber of the II stage. The pipeline for the gas outlet conduit of irrigation chamber of the III stage is attached to the irrigation chamber of the IV stage. The pipes of supply, bypass and gas withdrawal and absorbent are equipped with the magnetic valves. Pumps are equipped with frequency converters (inverters). Valves, inverters and air conditioner are connected to the unit of the automatic control system.

The invention allows to achieve the effect of a finite solubility of hard-to-recover gas components in the liquid and the automation of technological processes in order to reduce the power consumption.

5 Claims, 1 Drawing Sheet

(58) Field of Classification Search
USPC ..... 95/187, 199, 211; 96/244, 273, 290, 351
See application file for complete search history.

(56) References Cited

U.S. PATENT DOCUMENTS

| 8,685,235 B2 * | 4/2014 | Kolesnikov | C02F 3/04 |
| | | | 210/151 |
| 2006/0185517 A1 * | 8/2006 | Nagel | B01D 53/1406 |
| | | | 96/275 |

* cited by examiner

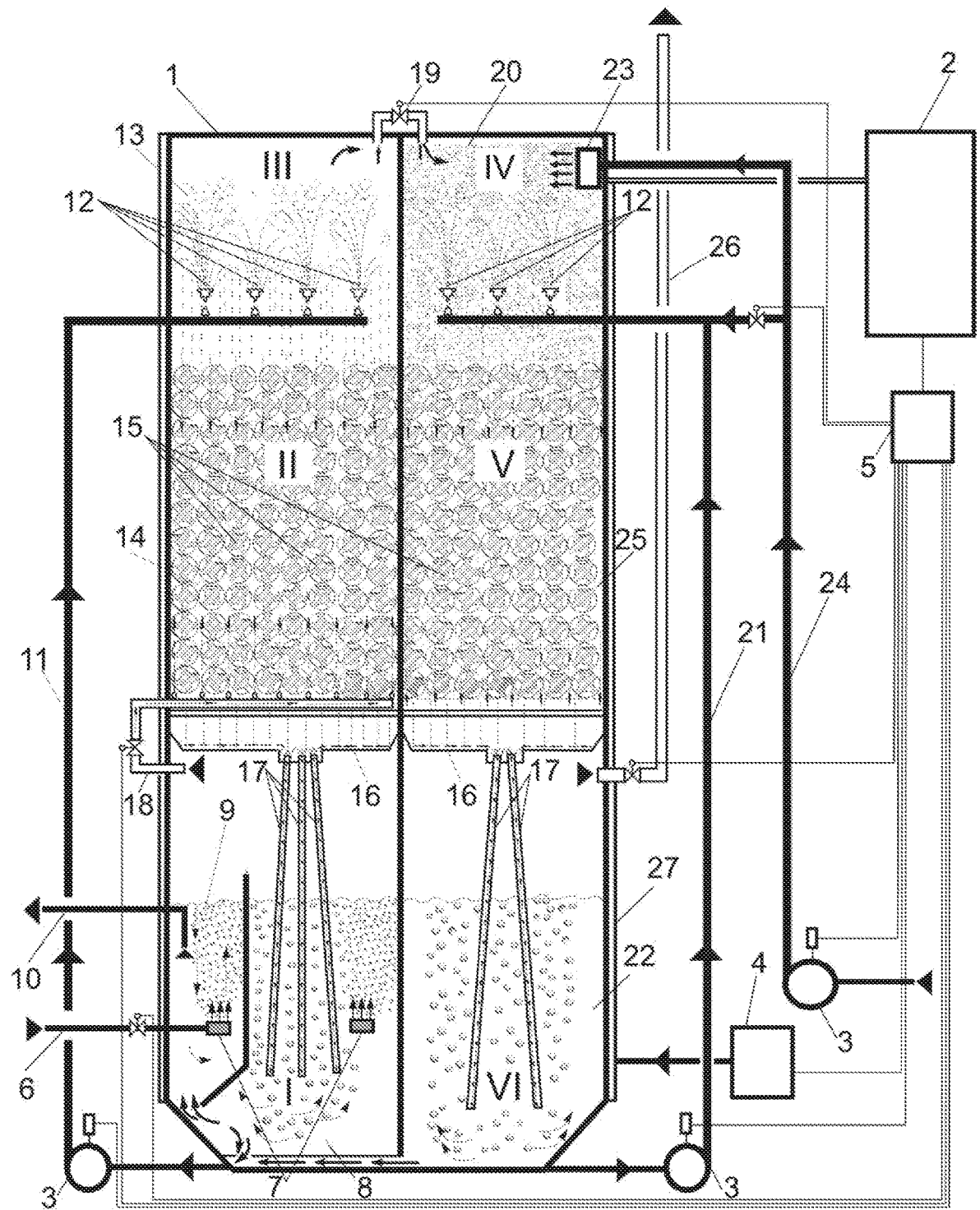

METHOD OF GAS ABSORPTION AND THE DEVICE FOR ITS IMPLEMENTATION

TECHNICAL FIELD

The invention relates to the mass transfer methods for extracting the components of mixed gas with the help of liquid and can be used in the mass transfer equipment in chemical industry.

Former Level of Technology

The processes of absorbing substances which have a finite solubility (up to 99%) use two and more contact stages with countercurrent gas flow and liquid in absorption tray columns up to 90 m in height with energy-intensive high-pressure pumps (n=2900 r./min.) and rotary gas blowers (book Sherwood T. Pigford R. Wilke Ch. Mass transfer. –M.: Chemistry. 1982).

There is a method for absorbing gases and a device for its implementation (patent RU No.2310499 C2, B01D 53/18, B01J 19/30, publication date 20 Feb. 2007), which includes a sequential liquid-gas contact in checker and bubbling chambers with six steps of purification, where the initial gas and a part of the circulating gas-liquid mixture is mixed in a high-pressure blower, and then the gas mixture is sent to the irrigation chamber of the first stage, which produces its contact with fine liquid droplets, which are formed when jets of liquid are put to the acoustical hypersonic dispersers, after that the gas-liquid mixture passes in a direct-flow mode through the loading elements of the checker chamber of the second stage, where further diffusion of gas into liquid occurs which is condensed in the containers of nozzle elements and on its surface; then the main part of the gas-liquid mixture is forced through the pipes direct injection into the upper layer liquid of the bubbling chamber of the third stage, vortex funnels take the remainder of the gas-liquid mixture, they are formed when the discharge of the condensed liquid to the aeration columns and the gas-liquid mixture come to the lower layer of the liquid of the bubbling chamber of the third stage, after that the gas-liquid mixture which has passed through the liquid of the bubbling chamber of the third stage is divided into two flows; the circulating portion of the mixture is fed into a high-pressure blower and another portion is sent to the irrigation chamber of the fourth stage, where further contact with the circulating liquid happens, which is sprayed into separate droplets with the use of reflective umbrellas of die-rolled section, then the final contact between the gas-liquid phases is carried out sequentially in the checker chamber of the fifth stage, aeration columns and the bubbling chamber of the sixth stage of purification.

However, when the direct flow of gas goes sequentially through the six chambers it is depleted, but at the same time, the concentration of gas molecules in the absorbent is gradually increasing so there is a possibility of unstable equilibrium between gas-liquid phases at the final stage of interphase contact. Therefore, the well-known method does not provide a maximum withdrawal of gas components.

There is a device for implementing this method, comprising six chambers, acoustical hypersonic dispersers are set into the irrigation chamber of the first stage, reflective umbrellas are set into irrigation chamber of the fourth stage, the packed chambers of the second and fifth stages are filled with spherical elements, the pipes of direct supply and aeration columns are set into the bubbling chamber of the third stage, and aeration columns are set in the bubbling chamber of the sixth stage.

However, there is no partial gas pressure in the device itself, that is why it reduces efficiency. Besides, the power consumption for operation of hypersonic generators is on average 1.5 kWh/m$^3$ of liquid. Therefore, the supply to the acoustical dispersants of the total consumption of fresh and circulating absorbent increases the consumption of power.

It is possible to improve the efficiency of absorption of gas molecules which have a finite solubility with the help of the device of two circuits of a turbulent motion of the liquid and gas flow through the packed and bubbling columns in a countercurrent and co-current mode and with the increase of a partial gas pressure.

The object of the invention is to achieve the effect of a finite solubility of hard-to-recover gas components in the liquid and the automation of technological processes to reduce the power consumption.

The technical result which has been achieved by the developers while solving the problem, was a stable equilibrium satiation of absorbent solution with gas molecules and a maximum removal of gas components with the minimum level of power consumption and the cost of equipment.

THE DEVELOPMENT OF THE INVENTION

The essence of the invention is that the process of gas absorption which includes the sequential contact of liquid and gas in six checker and bubbling chambers, the breakup of liquid droplets by acoustical hypersonic dispersants and reflective umbrellas, the use of load in the form of balls with the deepening in the spherical surface in the checker chamber, the gas involvement through the aeration columns into the bubbling chambers and a circulating pump, thus to complete the process of achieving equilibrium concentration of gas molecules in the liquid of derivable absorbent, at first the source gas disperses into the liquid of the final and/or the main bubbling chambers of the I contact stage, the main chamber is fed with the gas-liquid mixture formed by involvement of the recycle gas in the aeration columns in liquid draining from the checker chamber of the II contact stage, then the gas which appears in the I stage transfers to the checker chamber of the II stage, where during the countercurrent processes the further diffusion of gas into liquid takes place on the surface and in the containers of the nozzle elements, further there is a contact between the gas and the droplets of mixture absorbent from the bubbling chamber of the VI contact stage and the circulating fluid from the main chamber formed by means of the scattering reflector in the irrigation chamber of the III contact stage, then the gas is transferred to the irrigation chamber of the IV contact stage chamber where the unreacted gas contacts with finely dispersed liquid droplets, formed with the feeding of the portion of the fresh absorbent to the acoustical hypersonic dispersants, and the circulating liquid droplets and the rest of the fresh absorbent formed by a scattering reflector, then the gas-liquid mixture in a continuous-flow mode passes through the load elements of the checker chamber of the V contact stage where the condensation of the smallest liquid droplets occurs and the gas interphase contact with the liquid which is at the surface and inside the load elements, then the final process of absorption of gas molecules and liquid microdrops condensation is exercised by contact of the depleted gas and liquid in the aeration columns and by the volume of the bubbling chamber of the VI contact stage.

Furthermore, the essence of the invention is manifested in the fact that the device for performing the method comprising the installation, which consists of six chambers, aeration columns are installed in the bubbling chambers, checker chamber are filled with the spherical elements, the reflective umbrellas and the acoustical hypersonic dispersers are installed in the irrigation chambers, and the bubbling chamber of the I stage is divided by a partition into the final and the main bubbling chambers, and the ceramic dispersants and/or hypersonic Hartmann's oscillators are installed in them. The pipeline of the removal of the saturated absorbent is attached to the final chamber, and the circulation pumps are attached to the main chamber of the I stage the and bubbling chamber of the VI stage, the pressure pipelines of the circulation pumps are connected to the scattering reflectors of the irrigation chambers of the III and IV stages, the pressure pump pipeline for supplying of the fresh absorbent is connected to the hypersonic acoustical dispersant which is set in the irrigation chamber of the IV stage and in the pressure pipe of the circulation pump, which in turn is connected to the bubbling chamber of the VI stage.

At the same time, the essence of the invention is manifested in the fact that the closed space between the chambers of the I and II stages is attached by the pipeline of the gas discharge conduit to the distribution nozzles mounted at the bottom of the checker chamber of the II stage, and the pipeline for the gas outlet conduit of irrigation chamber of the III stage is attached to the irrigation chamber of the IV stage.

Finally, the essence of the invention is manifested in the fact that the pipes of supply, bypass and gas withdrawal and absorbent are equipped with the magnetic valves; pumps are equipped with frequency converters; solenoid valves, inverters and air conditioner are connected to the switching unit of the automatic control system.

The proof of the possibility of a given method implementation is given on the particular example in gas absorption apparatus. These typical example by no means limit alternative variants of the invention, they only explain the essence of the invention.

BRIEF DESCRIPTION OF THE DRAWING FIGURE

The adduced specific example of the invention of the device for the gas absorption is illustrated graphically:

FIG. 1 A diagram of the claimed device for performing the method.

THE BEST MODIFICATION OF THE DEVICE FOR PERFORMING THE METHOD

The device includes an installation 1 with six chambers; acoustic dispersion unit 2; pumps 3, air conditioner 4 and automatic control unit 5. The gas supply pipeline with electromagnetic valve 6 is connected to the ceramic 7 dispersants and/or hypersonic Hartmann's oscillators set in the bubbling chamber, which is divided by a partition into the main chamber 8 and the ultimate chamber 9. The chamber 9 is equipped with a water seal pipe 10 for discharging the saturated absorbent. The capacity of chamber 8 is connected to the circulation pump 3 by intake pipe, the pressure pipeline 11 is connected to the scattering reflectors 12 set in the irrigation chamber 13. The scattering reflectors 12 may take the form of nozzles with umbrellas as cylinders of different diameter having longitudinal rifling or in the form of drain connection with reflective discs. There is a checker chamber under the irrigation chamber 13 filled with ceramic load of spherical elements 15 with the deepenings on the spherical surface. There is a collecting pan 16 under the grate of the checker chamber 14 which has the effluent collector with connected ejection gas jet pipes (aeration columns) 17, the bottoms of which are put down to the lower liquid layer of bubbling chamber 8. The space between the chambers 8, 9 and 14 is closed, and the gas-outlet pipe with electromagnetic valve 18 is connected to it.

The pipeline 18, in turn, is equipped with nozzles for gas distribution by volume in the checker chamber 14. The chamber 14 is connected by bypass pipeline with electromagnetic valve 19 with the irrigation chamber 20. The scattering reflectors 12 are mounted in chamber 20 which are connected by pressure pipe 21 with the circulation pump 3, intake pipe of which is connected with the bubbling chamber 22. In chamber 20 acoustical hypersonic disperser 23 is also mounted, which the fresh absorbent pipeline 24 and the module 2 pipeline are supplied to. The fresh absorbent pipeline 24 is connected via a pipeline with the electromagnetic valve also to the pressure pipeline 21. There is a checker chamber 25 filled with the ceramic loading of spherical elements 15 with the deepenings on the spherical surface under the irrigation chamber 20. There is a collecting pan 16 under the grate of the chamber 25 which has the effluent collector with connected ejection gas jet pipes (aeration columns) 17, the bottoms of which are put down to the lower liquid layer of bubbling chamber 22. The space between the chambers 25 and 22 is closed, and the gas-outlet pipe with electromagnetic valve 26 is connected to it.

The body of installation is covered with heat-insulating wall 27 and has a space for the refrigerant flow from the air conditioner 4. The electromagnetic valves on the pipelines 6, 18, 19, 26, the acoustical dispersion unit 2, the frequency pump converters 3 and air conditioner 4 are connected by wires to the automatic control unit 5.

The device for implementing the method operates in the following way: the gas is fed through the pressure pipe with a regulating electromagnetic valve 6 to the ceramic dispersants 7 and/or hypersonic Hartmann's oscillators set in bubbling chamber 8 and 9. The gas-liquid mixture of circulating absorbent and gas comes to the chamber 8 through the aeration columns 17. In the chamber 8 a high level of solubility of the gas component in the absorbent and chemical reaction is achieved under intensive turbulent conditions. Absorbent solution flows through the hole from the chamber 8 to the chamber 9. Fresh gas bubbles dispersion via ceramic dispersants or Hartmann's oscillators up to 500 micrometers and the stay period in the chamber provides the ultimate equilibrium concentration of gas molecules in the solution. The saturated absorbent solution is discharged through the pipeline 10. Received and circulating gases are mixed and accumulated in interchamber space where at aeration columns penetration under the liquid level in the 1-1.5 meters it is possible to create partial gas pressure which equals to 4-2 MPa. The gas is then bypassed through the pipeline 18 to the bottom of the checker chamber 14. By means of the electromagnetic valve mounted on the pipeline the required partial gas pressure is regulated in the interchamber space and in the checker chamber 14. The gas fed to the chamber 14 through the evenly-spaced nozzles is spread in the chamber. Rising gas comes in contact with the liquid flowing down the loading elements 15. In countercurrent gas and liquid flow through the spherical loading elements 15 a liquid film and droplets are formed on them. When filling containers of one or two deepenings of the spherical elements the liquid flows to the lower elements. In the deepenings the gas molecules diffusion occurs through wetted surface of the elements and the liquid surface. The degree of absorbent saturation and chemical reaction are enhanced by increasing the residence time of the liquid in the loading. The liquid then flows down the collecting pan 16 to the effluent collector and to the aeration columns 17, where the gas inflow takes place and the gas-liquid mixture is formed. The gas bubbles exiting the bottoms of the columns are separated and rise. The estimated number of entrained gas by aeration columns at the height of columns above the liquid of the bubbling chamber 8 in the range of 1-2 m and lowering of the columns 1-3 m equals 0.9-0.5 $m^3/m^3$ of liquid. When the partial gas pressure in the chamber 14 is above atmospheric (0.1-4 MPa), the volume of inlet gas increases. The highest rates for the volume of the entrained air and mass transfer coefficients are specific of the aeration columns, where well-developed vortex funnels are formed. The gas from the rising bubbles of the aeration columns 17 and the bubbles of dispersants 7 is discharged via the pipeline 18 to the checker chamber 14, and then it comes to the irrigation chamber 13. Also a mixture of absorbent partly enriched by dissolved materials from the bubbling chamber 22 and the liquid from the chamber 8 is fed there by circulation pump 3 via the pipeline. When the liquid is fed to the scattering reflectors 12 the liquid flow is split against cylindrical protrusions and reflective umbrellas' slots, as a result a large number of small, medium and large liquid droplets are formed which have different motion trajectories. It is possible to use reflective discs for splitting. The camera 13 operates like a scrubber. Because of the increased partial gas pressure in the chamber 13, the gas flow moves through the pipeline 19 to the irrigation chamber 20. The electromagnetic valve mounted on the pipeline provides an estimated partial gas pressure in the chambers 20 and 25. The portion of fresh absorbent about 10-30% of the total consumption is fed to the acoustical dispersant 23 of the chamber 20 through the pipeline 24. The acoustical dispersion is based on the cavitation effect, which allows to develop a great pressure value resulting from the collapse of cavitation recesses. The value of the pressure amplitudes during the shock wave of collapse of cavitation recesses may reach hundreds of thousands of atmospheres which provides a guaranteed dispersing of liquid materials. Due to the use of longitudinal torsional hypersonic waveguide in acoustical dispersant 23 dispersant ratio increases by 2 times and more. The acoustical system is equipped with a hypersonic generator, inductive sensor of acoustical feedback, the cooling system and the magnetostrictive transducer all of which are placed in module 2.

In the mass transfer processes of the first, second and third stages the absorption of volatile gas components is carried out. At the same time the absorption of substances from the unreacted gas is more difficult. Therefore, the acoustic dispersion at the fourth processing stage creates a large interfacial contact area for trapping gas molecules. To create the necessary circulation of liquid and gas flows on the IV, V, VI contact stages, increase the surface contact between the phases and fusion of tiny droplets in the absorbent chamber 20 by the circulation pump 3 circulating absorbent solution is fed through the line 21 to the reflectors 12. The pipeline 24 is connected to 21 by the outlet with solenoid valve. The major part (90-70%) of fresh absorbent is fed through the outlet. Further, the gas-liquid mixture in the concurrent mode moves downward through the packed chamber 25. Due to the developed surface of the elements and the wetted surface of the liquid in the recesses and due to contact time the subsequent diffusion of gas molecules in liquid and chemical reactions occur. The liquid flowing down the collecting pan 16 in the effluent collector enters the aeration columns 17 and because of the occurrence of vortexes involves gas component with the smallest droplets of liquid into the chamber 22. When the gas and liquid move in the aeration columns 17 lifting a large number of gas bubbles the mass transfer process continues. Depleted gas which passed through the bubble chamber is concentrated in the interchamber space of the V and VI stages. To adjust the partial pressure of the gas between the circuit of the I, II, III contact stages and the circuit of the IV, V, VI contact stages, and also to enhance the surface diffusion effect of gas in the liquid it is possible to install the electromagnetic valve in the discharge pipe 26. Operating temperature is supported by the air conditioner 4 which feeds the coolant into the space between the insulating wall 27 and the body of the installation.

The block of automatic control unit 5 is a discrete automatic control system. In its structure it has the following modules: computing, interface, switching, selecting, analog-digital, digital-to-analog. When starting the automatic control unit diagnostics of the computation module operation takes place, then via the interface module that operates in full duplex mode energizing of primary information sensors occurs, after which the signal is removed from the sensors and transmitted to the analog-digital conversion module and then to the controller (test mode). In normal mode of sensor readings the system gives appropriate permission for the formation of the setting for the control systems of all peripherals 2, 3, 4, 5, 23. In case of malfunction it issues an error code of the system and switches to protected mode. After the formation of the settings the starting of the ultrasonic generator 2 and the water cooling circuit of magnetostrictive transducers arranged in an acoustic disperser 23 takes place. Local acoustic circuit control system (2, 23) through the sensor of acoustic feedback sets the amplitude of the ultrasonic vibrations which equals 15 microns, and then it is supported by the circuit of automatic frequency control. Then the gas supply system is started and the pressure sensor measures the current value of the pressure in the pipe 6 before the the solenoid valve. Upon reaching the set pressure in the pipe 6, the solenoid valve opens and the gas is fed on the ceramic dispersants 7 or Hartmann ultrasound whistles which produce gas dispersion in the liquid in chamber 8. In order to ensure efficient operation of the system the solenoid valve is controlled by it in such a manner that the pressure at the inlet of Hartmann whistle is stable. After that the frequency regulators (inverters) are started, they control the pumps 3 according to the pressure sensors readings and the given starting characteristics. For optimum performance of the process of gas absorption automatic control adjusts the work of irrigation systems of the cameras 13 and 20. As the dispersion quality sensors complex ultrasonic modules of volume measurement are used here, they are included in the circuits of the negative feedback of the operation of pumps 3. Once the set parameters of pressure and temperature are achieved in all cameras, global control system starts to reach the optimum operating modes according to the criterion of minimizing the given costs at maximum capacity.

INDUSTRIAL APPLICATION

Low-pressure circulation pumps are used for creating controlled counterflow and direct flow of liquid and gas in the suggested device of chemical synthesis. Double-circuit diagram of the gas absorption, acoustical dispersants and the creation of partial pressure of the gas enable maximum dissolution of the gas molecules and the absorption of substances which are difficult to recover. Ceramic dispersants, Hartmann's oscillators, spherical elements of the load, scattering reflectors increase the efficiency of mass transfer processes.

The intensification of mass transfer processes in new devices allows to reduce the height of equipment from 30-80 m to 7-10 m. The reliability of performance increases by using low pressure pumps with speed n=740-950 r./min. as the main electromechanical equipment. The consumption of electricity for the pumps is 0.3-0.5 kW per 1 $m^3$ of saturated absorbent. The energy consumption of the hypersonic generator for the gas dispersion (10-30% of the volume of fresh absorbent) varies between 0.3-0.5 kW per 1 $m^3$. The total power consumption including the cost of the gas and the air conditioner varies between 1-1.5 $kW/m^3$, what is 2-3 times lower than in the existing devices. The capital costs are reduced by 30%. New devices provide a stable equilibrium solute saturation of absorbent with gas molecules and a maximum removal of gas components.

The invention claimed is:

1. A method for absorbing a gas component from a supply gas containing said gas component by employing a liquid absorbent comprising:
   providing a six stage absorbent-gas contacting device with each of the six stages (I-VI) comprising a corresponding chamber (I-VI),
   feeding said supply gas to a first bubbling chamber I as a first stage and sequentially through each of the remaining stages II-VI where the gas is discharged from a second bubbler chamber VI after having the gas component reduced by absorption in each of the six stages, each bubbler chamber including an aeration column,
   providing a pair of checker chambers II and IV having load elements comprising balls with a spherical surface for contacting the gas with absorbent and a providing a pair of irrigation chambers III and IV having scattering reflectors with reflective umbrellas for forming liquid micro-drops of absorbent in a gas phase present in chambers III and IV,
   feeding a fresh supply of liquid absorbent to chamber IV with an acoustical hypersonic disperser into the gas phase therein,
   transferring the gas from first bubbler chamber I to checker chamber II which is above the first bubbler chamber, the gas transferring includes providing nozzles in the checker chamber II, circulating absorbent from the first bubbling chamber I to the scattering reflectors in irrigation chamber III located above the load elements in checker chamber II, allowing the absorbent from irrigation chamber III which has contacted gas in said chamber III to fall onto the load elements of chamber II and move countercurrent to gas supplied to checker chamber II via the nozzles, recycling a portion of the gas from checker chamber II along with liquid absorbent to the column aerator in the first bubbling chamber I, transferring the gas from irrigation chamber III to irrigation chamber IV where the gas contacts both fresh absorbent from the acoustical hypersonic disperser and circulated absorbent from second bubbler chamber VI fed through the scattering reflectors in chamber IV,
   passing the liquid absorbent and gas from chamber IV concurrently downward though the load elements of chamber V where the condensation of the smallest liquid absorbent droplets occurs and the gas interface contact with the liquid absorbent is at the surface and inside the load elements,
   feeding the contacted liquid absorbent and gas from checker chamber V through the aeration column into the bubbler chamber VI.

2. A device for absorbing a gas component from a gas supply containing said gas component employing a liquid absorbent comprising six chambers, the six chambers including a first bubbling chamber, a first checker chamber, a first irrigation chamber, a second irrigation chamber, a second irrigation chamber, a second checker chamber and a second bubbler chamber through which the gas sequentially flows so that the liquid absorbent which contacts the gas in each chamber absorbs said gas component from said supply gas, a final outlet for said gas from said second bubbling chamber which has had said gas component absorbed therefrom;
   an aeration column is provided in each bubbling chamber, spherical elements are provided in each checker chamber and scattering reflectors with reflective umbrellas are in each irrigation chamber, an acoustical hypersonic disperser is provided in the second of said irrigation chambers for feeding fresh liquid absorbent to said second irrigation chambers;
   wherein the first bubbling chamber includes an inlet for supply gas containing the gas component comprising a ceramic disperser and/or a hypersonic oscillator, and the first bubbling chamber is divided by a partition into a main bubbling chamber portion and a final outlet bubbling chamber portion, a pipe for the removal of saturated liquid absorbent from the final outlet bubbling chamber portion;
   a first circulation pump connected to first bubbling chamber and to said scattering reflectors in said first irrigation chamber so as to move absorbent from said first bubbler chamber to said scattering reflectors and a second circulation pump connected to the second bubbling chamber and to the scattering reflectors in said second irrigation chamber so as to move absorbent from said second bubbler chamber to said scattering reflectors in said second irrigation chamber, and a pressure pump for supplying said fresh absorbent to the acoustical hypersonic disperser and to the pressure side of the second circulating pump so that fresh absorbent can additionally flow to the scattering reflector in said second irrigation chamber.

3. The device of claim 2, wherein a closed, space between the chambers of the said first bubbler chamber and said first checker chamber is attached by a pipeline of a gas discharge conduit to distribution nozzles mounted at the bottom of the first checker chamber, and a pipeline for a gas outlet conduit of the first irrigation chamber is attached to the second irrigation chamber.

4. The device of claim 2, wherein pipes are provided for supply, bypass, gas withdrawal and absorbent and the pipes of supply, bypass and gas withdrawal and absorbent are equipped with magnetic valves; and the pumps are equipped with frequency converters; solenoid valves, inverters and an air conditioner are connected to a switching unit of an automatic control system.

5. The device of claim 3, wherein pipes are provided for supply, bypass, gas withdrawal and absorbent and the pipes of supply, bypass and gas withdrawal and absorbent are equipped with magnetic valves; and the pumps are equipped with frequency converters; solenoid valves, inverters and an air conditioner are connected to a switching unit of an automatic control system.

\* \* \* \* \*